United States Patent
Zhu (10) Patent No.: US 9,286,422 B2
(45) Date of Patent: Mar. 15, 2016

(54) GRAVITY LOADING PHASE OF A DEEP DRAWING MANUFACTURING SIMULATION INCLUDING EFFECTS OF SHEET METAL BLANK IN CONTACT WITH GUIDE PINS

(71) Applicant: Livermore Software Technology Corporation, Livermore, CA (US)

(72) Inventor: Xinhai Zhu, Pleasanton, CA (US)

(73) Assignee: Livermore Software Technology Corp., Livermore, CA (US)

(*) Notice: Subject to any disclaimer, the term of this patent is extended or adjusted under 35 U.S.C. 154(b) by 483 days.

(21) Appl. No.: 13/903,817

(22) Filed: May 28, 2013

(65) Prior Publication Data

US 2014/0358498 A1 Dec. 4, 2014

(51) Int. Cl.
*G06F 17/50* (2006.01)

(52) U.S. Cl.
CPC ........ *G06F 17/5018* (2013.01); *G06F 2217/42* (2013.01)

(58) Field of Classification Search
USPC ..................................... 703/2, 1, 7
See application file for complete search history.

(56) References Cited

U.S. PATENT DOCUMENTS

| | | | | |
|---|---|---|---|---|
| 9,057,277 B2 * | 6/2015 | Appleby | .................. | B22C 9/22 |
| 2010/0010782 A1 * | 1/2010 | Zhu | ...................... | G06F 17/5009 703/1 |
| 2012/0035890 A1 * | 2/2012 | Suzuki | .................. | B21D 22/20 703/1 |
| 2013/0041634 A1 * | 2/2013 | Zhu | ...................... | G06F 17/5018 703/2 |
| 2013/0325424 A1 * | 12/2013 | Zhu | ...................... | G06F 17/5018 703/6 |
| 2014/0125073 A1 * | 5/2014 | Yamada | ................. | B21D 53/88 293/133 |

\* cited by examiner

*Primary Examiner* — Thai Phan
(74) *Attorney, Agent, or Firm* — Roger H. Chu (57) ABSTRACT

Methods used in gravity loading phase of a deep drawing manufacturing simulation including effects of sheet metal blank in contact with guide pins are disclosed. Computerized models of sheet metal blank and guide pins are created. A subset of the nodes in the first computerized model is defined as parent nodes. First and second characteristic lengths are then determined. One or more child nodes are created between each pair of the parent nodes using a formula based on the ratio between the first and second characteristic lengths. Deformed configuration of the sheet metal blank is obtained under its own weight subject to the lateral constraints by conducting computer simulation of gravity loading phase, lateral constraints are created and added to at the child node's parents, when a contact between a child node and a particular finite element representing portion of outer surface of one of the guide pins is detected.

20 Claims, 10 Drawing Sheets

GRAVITY LOADING PHASE OF A DEEP DRAWING MANUFACTURING SIMULATION INCLUDING EFFECTS OF SHEET METAL BLANK IN CONTACT WITH GUIDE PINS

FIELD

The present invention generally relates to creation of a computerized model for mechanical computer aided engineering (CAE) analysis, more particularly to systems and methods in gravity loading phase of a deep drawing manufacturing simulation including effects of sheet metal blank in contact with guide pins.

BACKGROUND

Sheet metal forming has been used in the industry for years for creating metal parts from a blank sheet metal, for example, automobile manufacturers and their suppliers produce many parts using sheet metal forming. One of the most used sheet metal forming processes is deep drawing, which involves a hydraulic or mechanical press pushing a specially-shaped punch into a matching die with a piece of blank sheet metal in between. Exemplary products made from this process include, but are not limited to, car hood, fender, door, automotive fuel tank, kitchen sink, aluminum can, etc. In some areas of the die, the depth of a part or product being made is generally more than half its diameter. As a result, the blank is stretched and therefore thinned in various locations due to the geometry of the part or product. The part or product is only good when there is no structural defect such as material failure (e.g., cracking, tearing, wrinkling, necking, etc.).

Figure 1A:
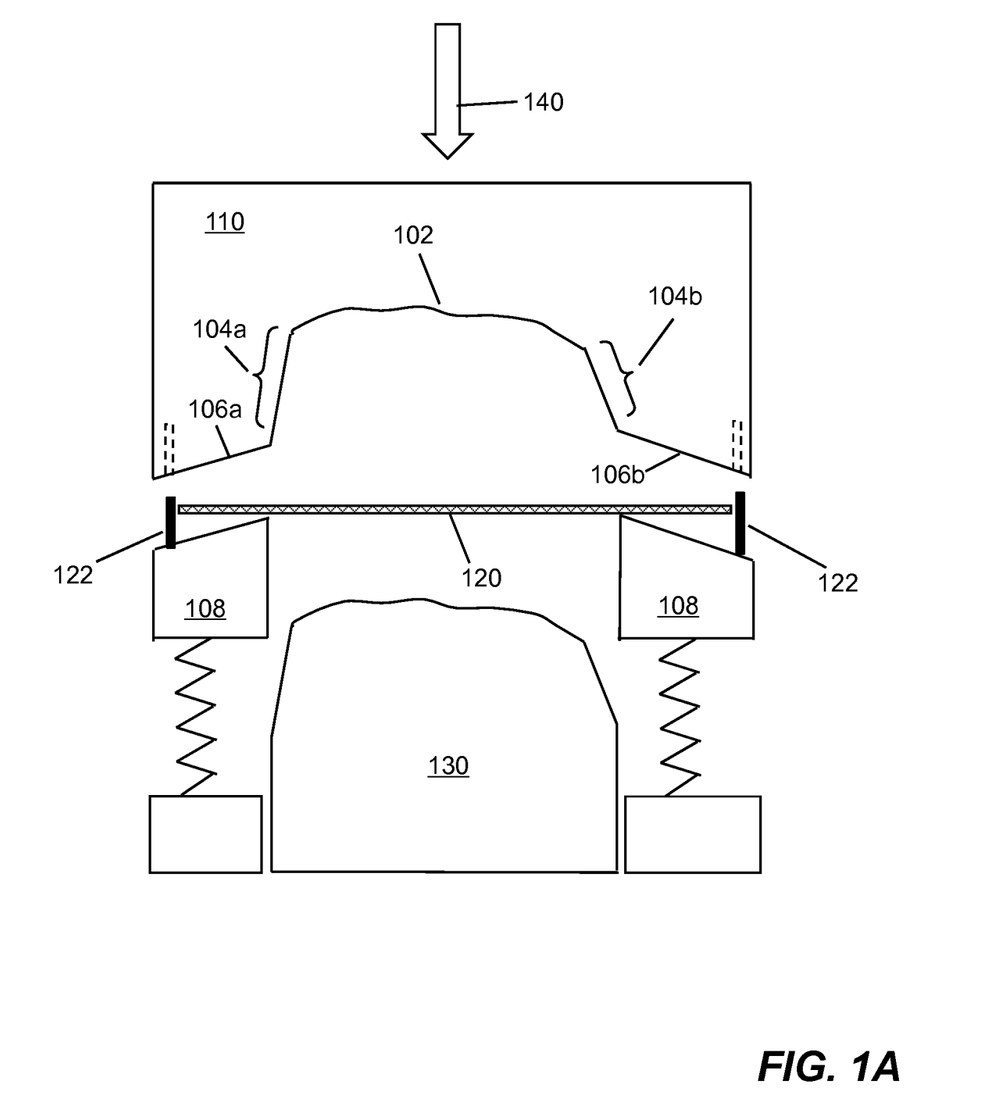
FIG. 1A is a diagram showing an elevation cross-section view of an exemplary set up of a draw die for deep draw manufacturing of a sheet metal part.
Figure 1B:
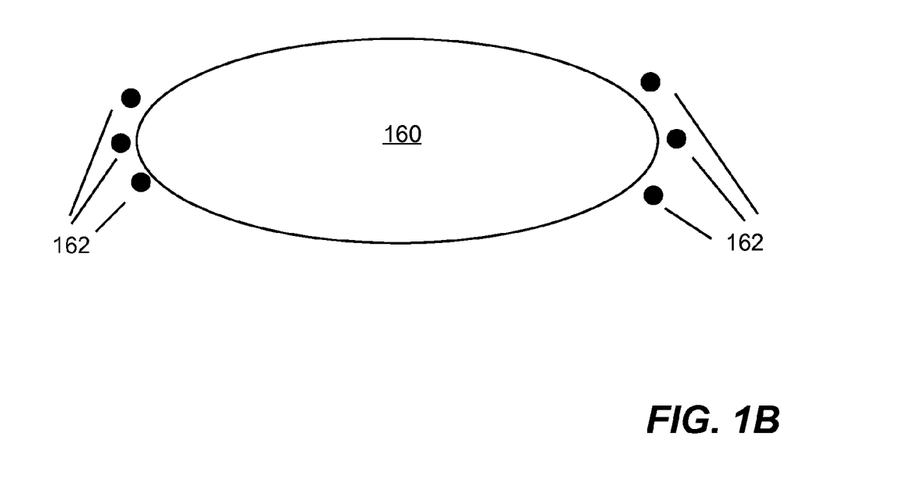
FIG. 1B is a diagram showing a plan view of a first exemplary sheet metal blank and surrounding guide pins that can be numerically simulated in accordance with one embodiment of the present invention.
Figure 1C:
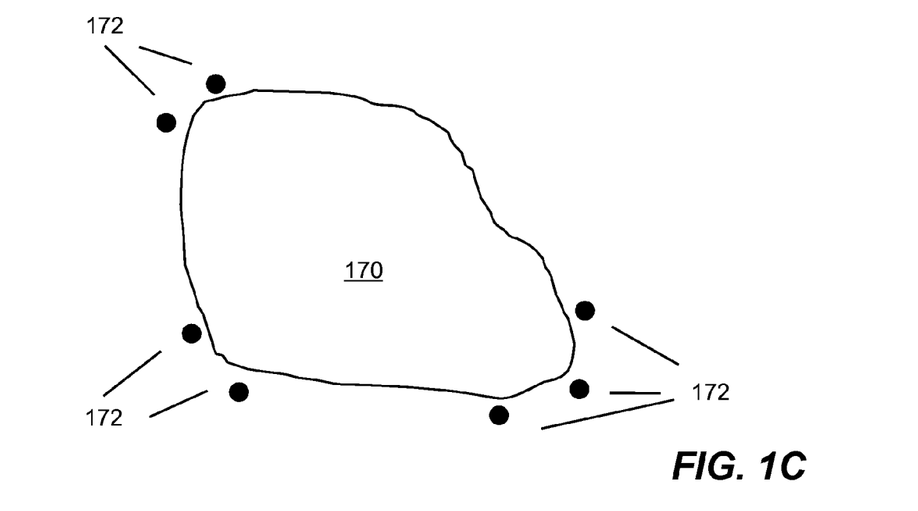
FIG. 1C is a diagram showing a plan view of a second exemplary sheet metal blank and surrounding guide pins configured in a draw die that can be numerically simulated in accordance with one embodiment of the present invention.

FIG. 1A shows an exemplary deep drawing manufacturing setup, in which a sheet metal blank or blank 120 (i.e., an unformed sheet metal plate before being formed) rests on a blank holder 108 between an upper die 110 and a punch 130. The blank 120 is formed into a sheet metal part when the die 110 is pushed down to the punch 130 in the direction of the draw axis (shown by an arrow 140). The die 110 includes a product design section 102, binder section 106a-b and addendum section 104a-b. A number of guide pins or guide posts 122 are configured for precisely the blank 120. FIG. 1B shows a plan view of an exemplary sheet metal blank 160 and guide pins 162. The sheet metal blank 160 can move laterally within a perimeter defined by locations of the guide pins 162. For illustration simplicity, an oval shape is shown for the sheet metal blank 160. Those of ordinary skill in the art would know that the sheet metal blank 170 can have any arbitrary shape shown in FIG. 1C. The sheet metal blank 170 is surrounded by a number of guide pins 172.

In order to successfully manufacture a sheet metal part, many of the today's manufactures uses computer or numerical simulations (e.g., Computer Aided Engineering Analysis (CAE)) to help them to achieve such a goal. One useful computer simulation is based on finite element analysis (FEA), which is a computerized method widely used in industry to model and solve engineering problems relating to complex systems. FEA derives its name from the manner in which the geometry of the object under consideration is specified. With the advent of the modern digital computer, FEA has been implemented as FEA software. FEA software can be classified into two general types, implicit FEA software and explicit FEA software. Implicit FEA software uses an implicit equation solver to solve a system of coupled linear equations. Such software is generally used to simulate static or quasi-static problems. Explicit FEA software does not solve coupled equations but explicitly solves for each unknown assuming them uncoupled. Explicit FEA software usually uses central difference time integration which requires very small time steps for the method to be stable and accurate. Explicit FEA software is generally used to simulate short duration events where dynamics are important such as impact type events.

Figure 2:
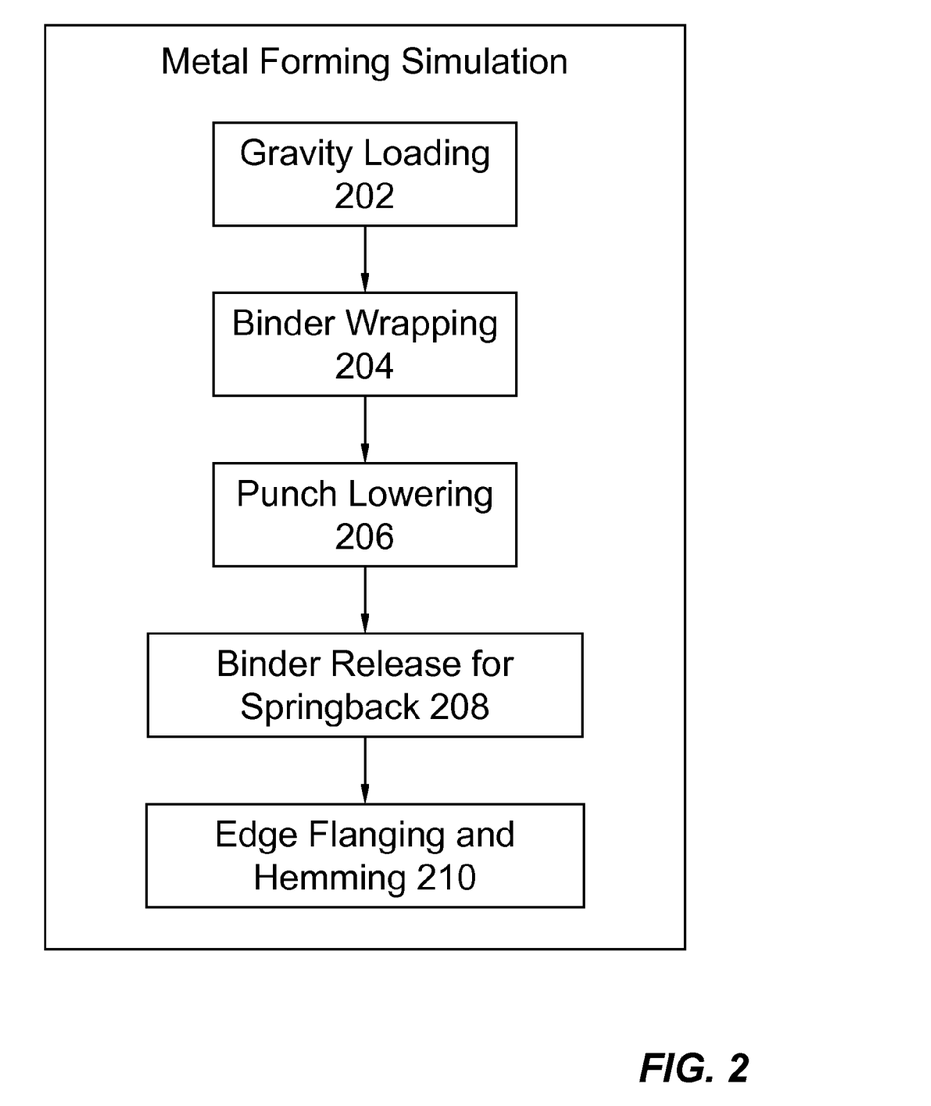
FIG. 2 is a diagram showing an exemplary series of related deep draw manufacturing simulations of sheet metal part.

In simulating a deep drawing manufacturing of a sheet metal part, a number of different types of simulation are performed. FIG. 2 lists an exemplary series of such simulations. The exemplary series is a metal forming simulation (e.g., forming an automobile part from sheet metal). Metal forming simulation comprises a number of phases: 1) gravity loading 202, 2) binder wrapping 204, 3) punch lowering 206, 4) binder release for springback 208 and 5) edge flanging and hemming 210.

The present invention is directed to numerically simulation of the gravity loading phase 202 of a deep drawing manufacturing. In particular, effects of guide pins in contact with sheet metal blank are considered and modeled in the simulation. During gravity loading phase, the sheet metal blank 120 is placed on top of the blank holder 108. The sheet metal blank 120 can move laterally without constraint until it contacts with one or more guide pins 122.

Prior art approaches have been requiring drastic changes to the computerized model (i.e., refining FEA mesh) of the sheet metal blank so that contacts between the sheet metal blank and guide pins can be detected. Drawbacks for refining FEA mesh of the sheet metal blank are not only tedious, but also expensive in terms of man hours and computer resources (i.e., larger memory, longer execution time, etc.).

It would therefore desirable to have more efficient systems and methods in gravity loading phase of a deep draw manufacturing simulation including effects of sheet metal blank in contact with guide pins.

SUMMARY

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Systems and methods used in gravity loading phase of a deep drawing manufacturing simulation including effects of sheet metal blank in contact with guide pins are disclosed. According to one aspect, a first computerized model representing a sheet metal blank and a second computerized model representing outer surface of guide pins are defined and received in a computer system. Each of the first and second computerized models contains a number of nodes connected by elements. A subset of the nodes in the first computerized model is defined as a group of parent nodes.

First and second characteristic lengths are determined in the first and second computerized models, respectively. The first characteristic length is the distance between each neighboring pair of the parent nodes. The second characteristic length is the shortest dimension of the elements in the second computerized model. A number of child nodes are created between each pair of the parent nodes using a formula based on the ratio between the first and the second characteristic length.

Deformed configuration of the sheet metal blank is then obtained under its own weight subject to the created lateral constraints by conducting computer simulation of gravity loading phase, lateral constraints are created and added to at the child node's parents, when a contact between a child node and a particular finite element representing outer surface of guide pins is detected.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 3A-7. However, those skilled in the art will readily appreciate that the detailed description given herein with respect to these figures is for explanatory purposes as the invention extends beyond these limited embodiments.

Figure 4:
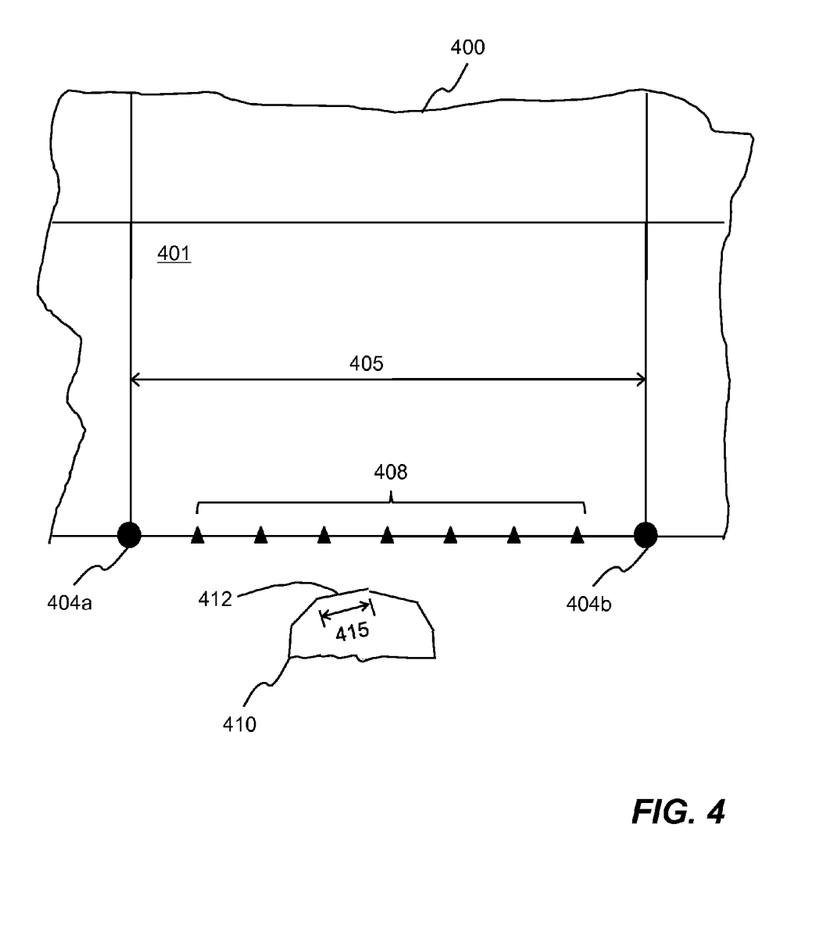
FIG. 4 is a diagram showing an exemplary scheme of parent and child nodes, according to one embodiment of the present invention.
Figure 5A:
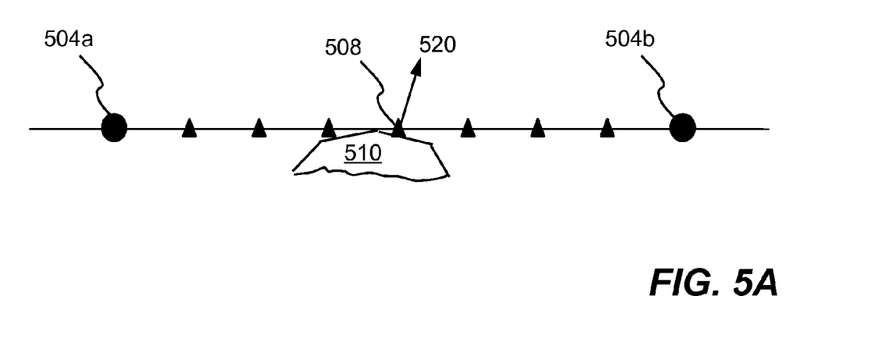
FIGS. 5A-5E are diagrams showing exemplary schemes for creating lateral constraints to a computerized model representing a sheet metal blank due to contact with guide pins in gravity loading phase of deep drawing manufacturing simulation, according to an embodiment of the present invention.
Figure 5B:
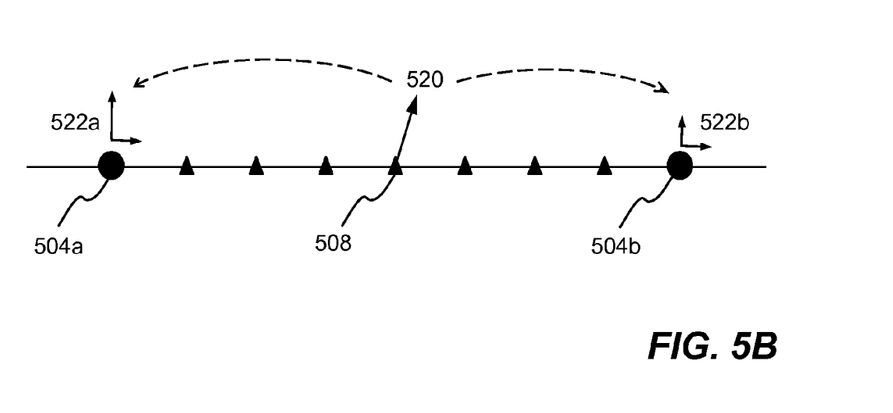
Figure 6:
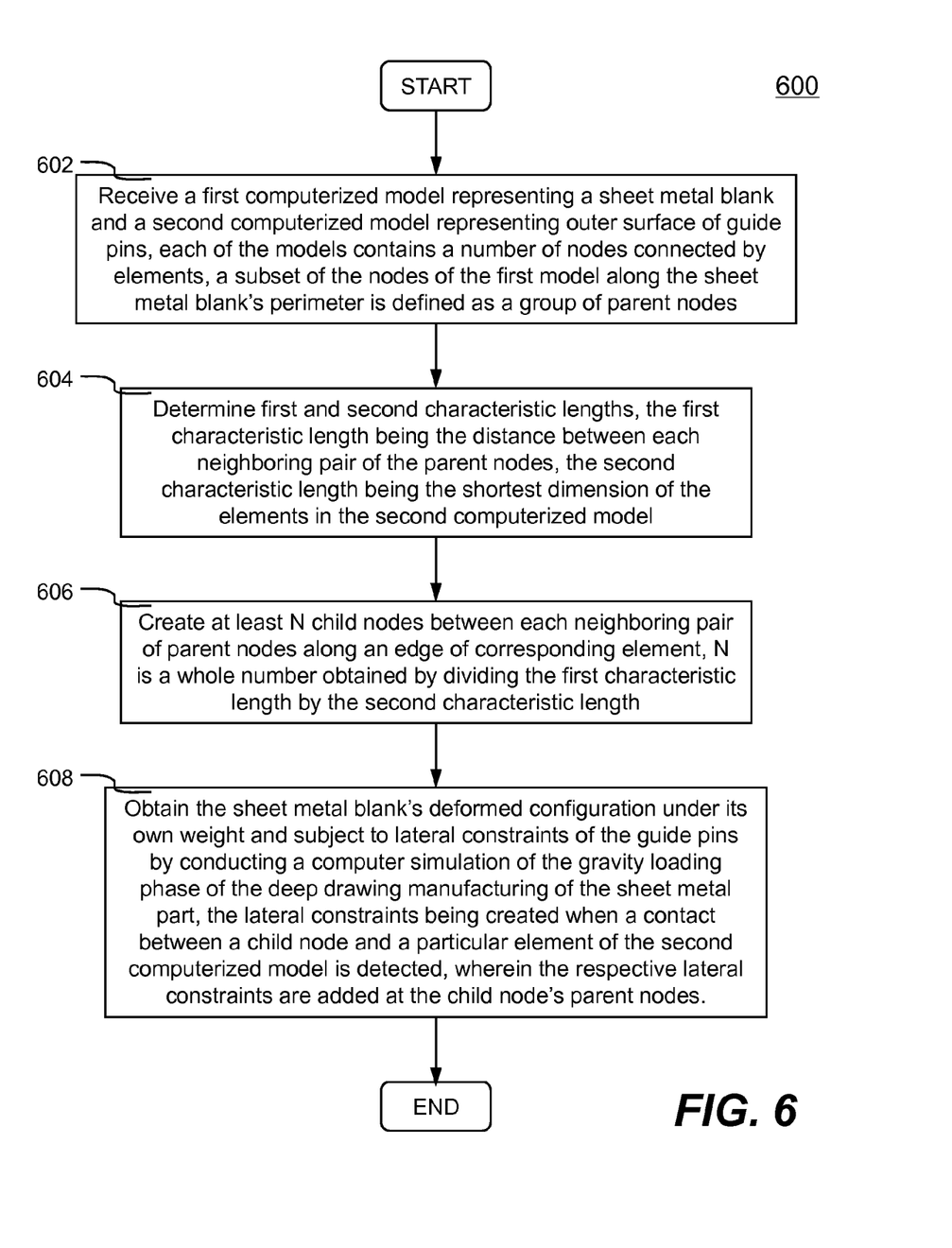
FIG. 6 is a flowchart illustrating an exemplary process of including effects of sheet metal blank in contact with guide pins in gravity loading phase of a deep draw manufacturing simulation of a sheet metal part, according to one embodiment of the present invention.

Referring first to FIG. 6, it is shown a flowchart illustrating an exemplary process 600 of including effects of sheet metal blank in contact with guide pins in gravity loading phase of a deep draw manufacturing simulation of a sheet metal part. Process 600 is preferably implemented in software and understood in conjunction with other figures particularly FIGS. 3A-5B.

Process 600 starts by receiving a first computerized model representing a sheet metal blank and a second computerized model representing outer surface of guide pins in a computer system (e.g., computer system 700 of FIG. 7) at step 602. The first and second computerized models can be finite element analysis models (e.g., FEA meshes defined by nodes connected by two-dimensional shell elements) used in a computer simulation of deep drawing manufacturing of a sheet metal part.

Figure 3A:
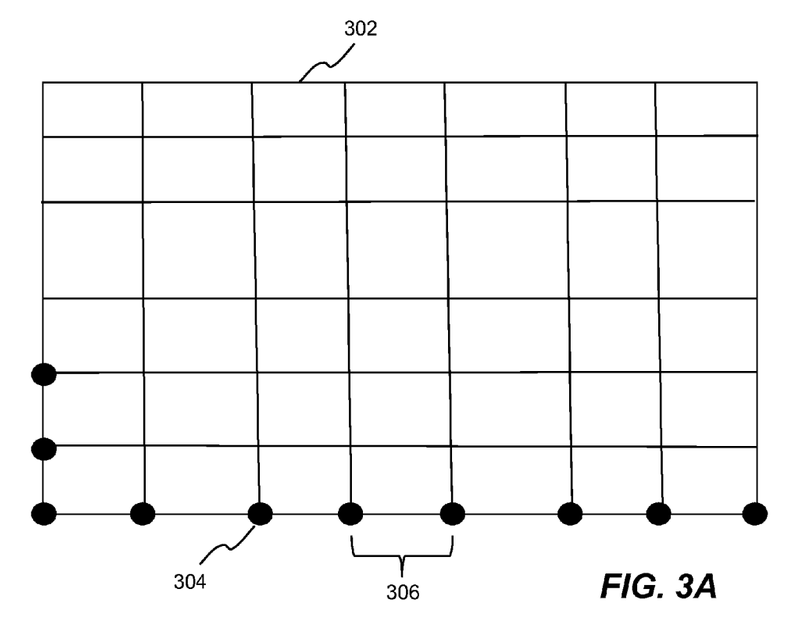
FIG. 3A is a diagram showing an exemplary computerized model of a sheet metal blank in accordance with one embodiment of the present invention.
Figure 3B:
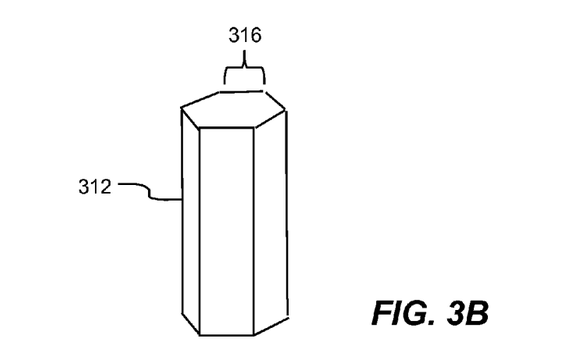
FIG. 3B is a diagram showing an exemplary computerized model of a guide pin in accordance with one embodiment of the present invention.

FIG. 3A shows an exemplary first FEA mesh model 302 representing sheet metal blank while FIG. 3B shows an exemplary second FEA model 312 representing outer surface of a guide pin. It is noted that two exemplary models 302-312 are not illustrated with the same scale. In this example, the first FEA model 302 is drawn with a much smaller scale comparing to the second FEA model 312. Additionally, the first FEA model 302 can have arbitrary shape (e.g., oval shape and non-regular shape shown in FIGS. 1B and 1C). The second FEA model 312 can have different number of shell elements to represent the outer surface (i.e., instead of six shell elements shown in FIG. 3B).

A subset of nodes of the first computerized model located along the sheet metal blank's perimeter is defined or designated as a group of parent nodes, which are used for creating child nodes configured for detecting contacts with the guide pins. Exemplary parent nodes 304 are shown in FIG. 3A. Parent nodes can be defined/designated/specified by user or other means (e.g., default definition in application module).

At step 604, first and second characteristic lengths are determined. The first characteristic length is the distance 306 between each neighboring pair of parent nodes, while the second characteristic length is the shortest dimension 316 of the finite elements of the second FEA model 312.

Next, at step 606, at least N child nodes are created between each neighboring pair of parent nodes. The child nodes are located along an edge of a finite element in the first FEA model. N is a positive integer determined by dividing the first characteristic length by the second characteristic length, and then rounding to an integer. FIG. 4 shows an exemplary scheme of parent and child nodes used in an embodiment of the present invention. Portion of an exemplary first FEA analysis model 400 representing sheet metal blank and a top view of a portion of an exemplary second FEA model representing a guide pin 410 are shown in FIG. 4. A typical finite element 401 of the first FEA model 400 has two parent nodes 404a-404b along the perimeter. The first characteristic length 405 is the distance between parent node 404a and parent node 404b (i.e., neighboring pair of parent nodes). The second FEA model 410 contains finite element 412 representing outer surface of the guide pin. The second characteristic length 415 is the shortest dimension of the finite elements in the second FEA model 410. N child nodes 408 are created between the parent nodes 404a-404b.

Finally, at step 608, deformed configuration the sheet metal blank under its own weight and subject to lateral constraints of the guide pins is obtained by conducting a computer simulation of the gravity loading phase of the deep drawing manufacturing of the sheet metal part. The lateral constraints are created when contact between a child node and a particular finite element of the second FEA model is detected. The respective lateral constraints are added to the child node's parents. An exemplary sequence of adding lateral constraints are shown in FIGS. 5A-5B.

Shown in FIG. 5A, a child node 508 is checked whether it is in contact with outer surface of a guide pin (represented by the second FEA model) 510. When a contact between child node 508 and a particular finite element of the second FEA model 510 is detected, a lateral constraint force 520 normal or orthogonal to the particular finite element is created at the child node 508. The lateral constraint force 520 is then converted to two equivalent constraint forces 522a-522b at respective parent nodes 504a-504b as shown in FIG. 5B. The conversion can be performed with many well known techniques, for example, static equilibrium.

Figure 5C:
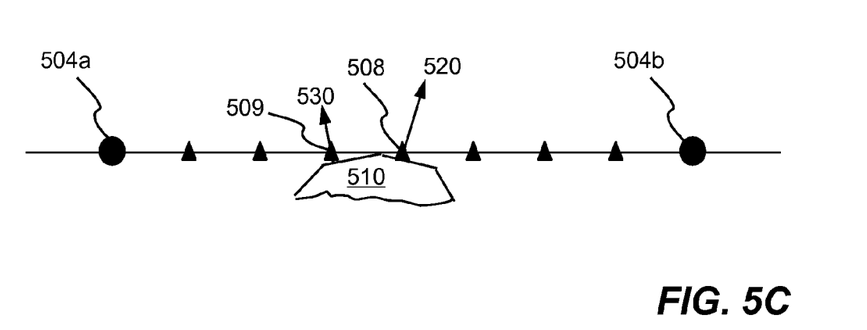
Figure 5D:
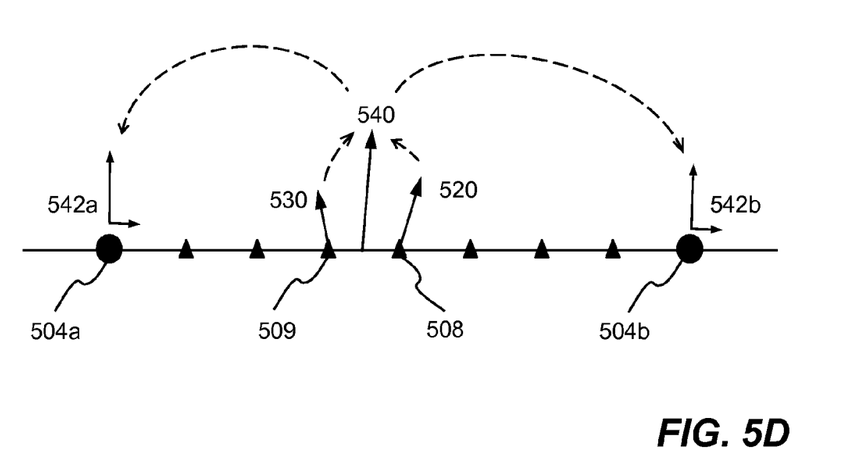
Figure 5E:
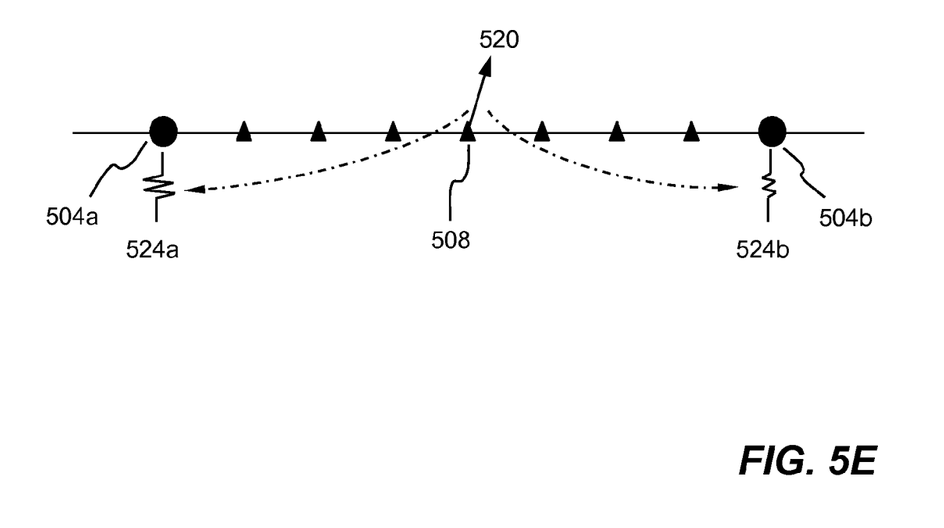

In another exemplary scheme shown in FIGS. 5C-5D, two contacts are detected: one at first child node 508, another at second child node 509. As a result, two resistant forces 520-530 are created for lateral constraints. The resultant force 540 of the resistant forces 520-530 is then converted into equivalent lateral resistant forces 542a-542b at parent nodes 504a-504b.

In explicit finite element analysis, a spring representing lateral constraint or resistance force 520 is added to the location of contact normal to the surface shown in FIG. 5B. In implicit finite element, instead of resistance force, a lateral stiffness term is added to respective parent nodes (e.g., springs 524a-524b shown in FIG. 5E). When there are more than one contact detected, the lateral constraint forces at the parent nodes can be determined by averaging of all contact resistance forces.

Figure 7:
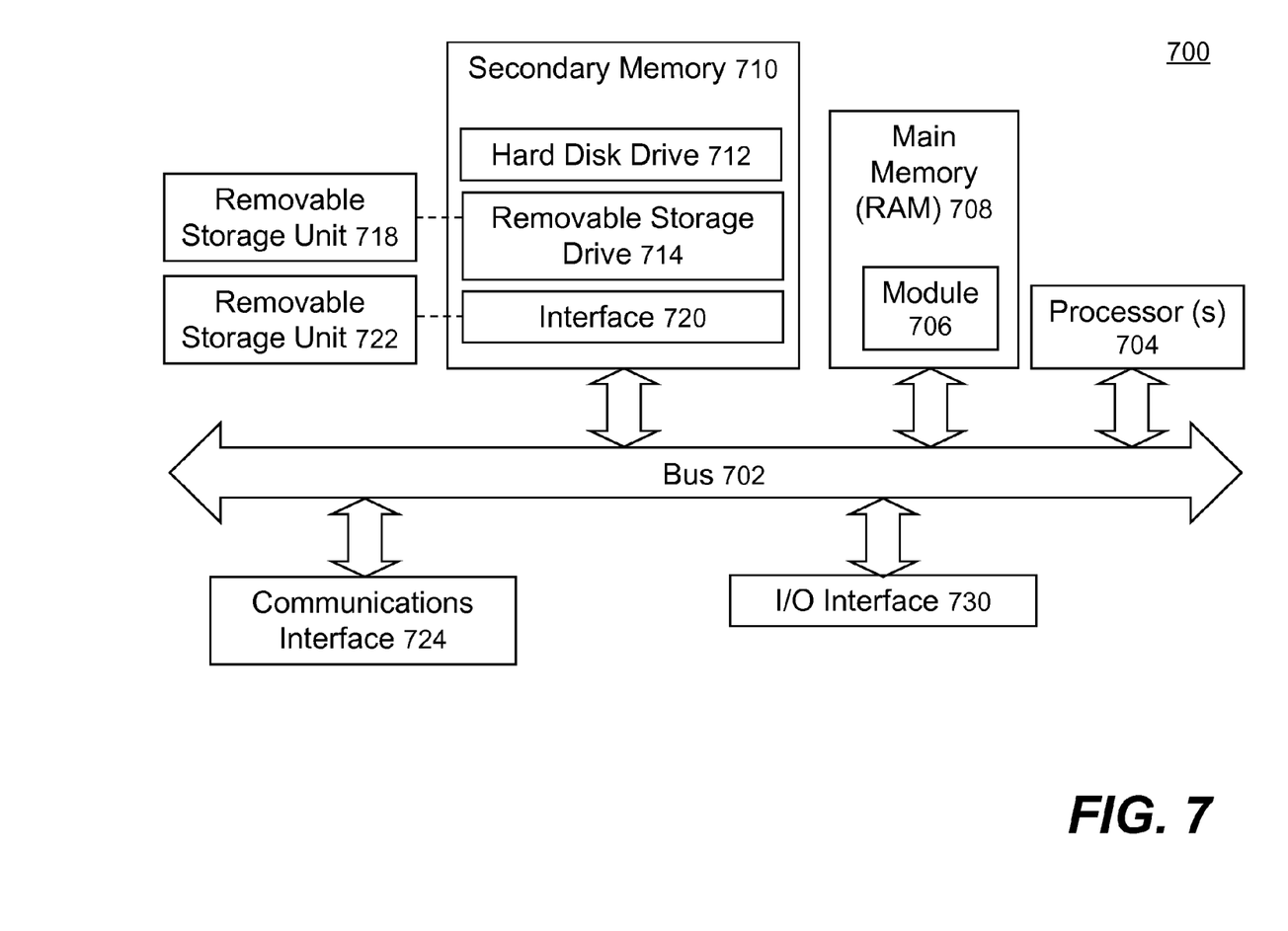
FIG. 7 is a functional block diagram showing salient components of an exemplary computer, in which one embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium" and "computer usable medium" are used to generally refer to media such as removable storage drive 714, and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712).

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas only one guide pin has been shown and described in an example depicted in FIGS. 5A-5B, there can be more than one guide pin. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of including effects of a sheet metal blank in contact with guide pins in gravity loading phase of a deep draw manufacturing simulation of a sheet metal part, said method comprising:

receiving a first finite element analysis (FEA) model representing a sheet metal blank and a second FEA model representing outer surface of guide pins in a computer system having a FEA application module installed thereon, each of said first and second FEA models containing a plurality of nodes connected a plurality of finite elements, and a subset of the nodes of the first FEA model located along the sheet metal blank's perimeter being defined as a group of parent nodes;

determining first and second characteristic lengths, the first characteristic length being distance between each neighboring pair of the parent nodes and the second characteristic length being shortest dimension of all of the finite elements of the second FEA model;

creating at least N child nodes between said each pair of the parent nodes along an edge of corresponding finite element, N is a positive integer obtained by dividing the first characteristic length by the second characteristic length; and obtaining the sheet metal blank's deformed configuration under its own weight and subject to lateral constraints of the guide pins by conducting a computer simulation of the gravity loading phase of deep drawing manufacturing of a sheet metal part, the lateral constraints being created when a contact between a child node and a particular finite element of the second FEA model is detected, wherein the respective lateral constraints are added at said child node's parent nodes.

2. The method of claim 1, wherein the group of parent nodes are located along perimeter of the first FEA model.

3. The method of claim 1, wherein said lateral constraints being created when a contact between a child node and a particular finite element of the second FEA model is detected is accomplished by adding equivalent lateral forces at corresponding parent nodes of said child node, the equivalent lateral forces being derived from contact forces detected between said child node and said particular finite element, if the computer simulation uses explicit finite element scheme.

4. The method of claim 3, wherein said equivalent lateral forces is prorated from the contact forces.

5. The method of claim 3, wherein each of the contact forces is modeled as an additional spring in the first FEA model and said each of the contact forces is in a direction normal to the particular finite element through said child node, wherein the particular finite element represents a particular portion of the outer surface of one of the guide pins.

6. The method of claim 1, wherein said lateral constraints being created when a contact between a child node and a particular finite element of the second FEA model is detected is accomplished by adding equivalent lateral stiffness at corresponding parent nodes of said child node, the equivalent lateral stiffness being derived from contact forces detected between said child node and said particular finite element, if the computer simulation uses implicit finite element scheme.

7. The method of claim 6, wherein each of the contact forces is in a direction normal to the particular finite element through said child node.

8. The method of claim 7, wherein said equivalent lateral stiffness is a term based on average of all of the contact forces and added to regular stiffness matrix of the first FEA model.

9. A system for creating a computerized model for a deep draw manufacturing simulation of a sheet metal part, said system comprising:

an input/output (I/O) interface;

a memory for storing computer readable code for a finite element analysis (FEA) application module; and at least one processor coupled to the memory, said at least one processor executing the computer readable code in the memory to cause the FEA application module to perform operations of:

receiving a first FEA model representing a sheet metal blank and a second FEA model representing outer surface of guide pins, each of said first and second FEA models containing a plurality of nodes connected a plurality of finite elements, and a subset of the nodes of the first FEA model located along the sheet metal blank's perimeter being defined as a group of parent nodes;

determining first and second characteristic lengths, the first characteristic length being distance between each neighboring pair of the parent nodes and the second characteristic length being shortest dimension of all of the finite elements of the second FEA model;

creating at least N child nodes between said each pair of the parent nodes along an edge of corresponding finite element, N is a positive integer obtained by dividing the first characteristic length by the second characteristic length; and obtaining the sheet metal blank's deformed configuration under its own weight and subject to lateral constraints of the guide pins by conducting a computer simulation of the gravity loading phase of deep drawing manufacturing of a sheet metal part, the lateral constraints being created when a contact between a child node and a particular finite element of the second FEA model is detected, wherein the respective lateral constraints are added at said child node's parent nodes.

10. The system of claim 9, wherein said lateral constraints being created when a contact between a child node and a particular finite element of the second FEA model is detected is accomplished by adding equivalent lateral forces at corresponding parent nodes of said child node, the equivalent lateral forces being derived from contact forces detected between said child node and said particular finite element, if the computer simulation uses explicit finite element scheme.

11. The system of claim 10, wherein each of the contact forces is modeled as an additional spring in the first FEA model and said each of the contact forces is in a direction normal to the particular finite element through said child node.

12. The system of claim 9, wherein said lateral constraints being created when a contact between a child node and a particular finite element of the second FEA model is detected is accomplished by adding equivalent lateral stiffness at corresponding parent nodes of said child node, the equivalent lateral stiffness being derived from contact forces detected between said child node and said particular finite element, if the computer simulation uses implicit finite element scheme.

13. The system of claim 12, wherein each of the contact forces is in a direction normal to the particular finite element through said child node, wherein the particular finite element represents a particular portion of the outer surface of one of the guide pins.

14. The system of claim 13, wherein said equivalent lateral stiffness is a term based on average of all of the contact forces and added to regular stiffness matrix of the first FEA model.

15. A non-transitory computer readable storage medium containing instructions for including effects of a sheet metal blank in contact with guide pins in gravity loading phase of a deep draw manufacturing simulation of a sheet metal part by a method comprising:
receiving a first finite element analysis (FEA) model representing a sheet metal blank and a second FEA model representing outer surface of guide pins in a computer system having a FEA application module installed thereon, each of said first and second FEA models containing a plurality of nodes connected a plurality of finite elements, and a subset of the nodes of the first FEA model located along the sheet metal blank's perimeter being defined as a group of parent nodes;
determining first and second characteristic lengths, the first characteristic length being distance between each neighboring pair of the parent nodes and the second characteristic length being shortest dimension of all of the finite elements of the second FEA model;
creating at least N child nodes between said each pair of the parent nodes along an edge of corresponding finite element, N is a positive integer obtained by dividing the first characteristic length by the second characteristic length; and
obtaining the sheet metal blank's deformed configuration under its own weight and subject to lateral constraints of the guide pins by conducting a computer simulation of the gravity loading phase of deep drawing manufacturing of a sheet metal part, the lateral constraints being created when a contact between a child node and a particular finite element of the second FEA model is detected, wherein the respective lateral constraints are added at said child node's parent nodes.

16. The non-transitory computer readable storage medium of claim 15, wherein said lateral constraints being created when a contact between a child node and a particular finite element of the second FEA model is detected is accomplished by adding equivalent lateral forces at corresponding parent nodes of said child node, the equivalent lateral forces being derived from contact forces detected between said child node and said particular finite element, if the computer simulation uses explicit finite element scheme.

17. The non-transitory computer readable storage medium of claim 16, wherein each of the contact forces is modeled as an additional spring in the first FEA model and said each of the contact forces is in a direction normal to the particular finite element through said child node.

18. The non-transitory computer readable storage medium of claim 15, wherein said lateral constraints being created when a contact between a child node and a particular finite element of the second FEA model is detected is accomplished by adding equivalent lateral stiffness at corresponding parent nodes of said child node, the equivalent lateral stiffness being derived from contact forces detected between said child node and said particular finite element, if the computer simulation uses implicit finite element scheme.

19. The non-transitory computer readable storage medium of claim 18, wherein each of the contact forces is in a direction normal to the particular finite element through said child node, wherein the particular finite element represents a particular portion of the outer surface of one of the guide pins.

20. The non-transitory computer readable storage medium of claim 19, wherein said equivalent lateral stiffness is a term based on average of all of the contact forces and added to regular stiffness matrix of the first FEA model.

* * * * *